United States Patent
Song

(10) Patent No.: US 8,311,592 B2
(45) Date of Patent: Nov. 13, 2012

(54) PORTABLE TERMINAL HAVING EXTERNAL MODULE AND METHOD FOR DISPLAYING CHARGED STATUS THEREOF

(75) Inventor: Yang-Seok Song, Seoul (KR)

(73) Assignee: LG Electronics Inc., Seoul (KR)

( * ) Notice: Subject to any disclaimer, the term of this patent is extended or adjusted under 35 U.S.C. 154(b) by 644 days.

(21) Appl. No.: 12/260,531

(22) Filed: Oct. 29, 2008

(65) Prior Publication Data
US 2009/0163247 A1    Jun. 25, 2009

(30) Foreign Application Priority Data
Dec. 21, 2007    (KR) .................. 10-2007-0135702

(51) Int. Cl.
*H04M 1/00* (2006.01)

(52) U.S. Cl. ........ 455/573; 455/566; 320/117; 320/120; 320/162

(58) Field of Classification Search .................. 455/556, 455/573
See application file for complete search history.

(56) References Cited

U.S. PATENT DOCUMENTS

| | | | |
|---|---|---|---|
| 6,102,284 A * | 8/2000 | Myers et al. ................... | 235/375 |
| 2005/0169203 A1* | 8/2005 | Sinnarajah et al. ........... | 370/312 |
| 2005/0233205 A1* | 10/2005 | Koike ............................. | 429/90 |
| 2006/0258406 A1* | 11/2006 | Igarashi et al. ............... | 455/567 |
| 2008/0080703 A1* | 4/2008 | Penning et al. .......... | 379/428.02 |
| 2008/0140164 A1* | 6/2008 | Oberreiter et al. .............. | 607/88 |
| 2008/0242229 A1* | 10/2008 | Sharma ........................ | 455/41.3 |

FOREIGN PATENT DOCUMENTS
GB    2416953 A  *  2/2006
* cited by examiner

*Primary Examiner* — Charles Appiah
*Assistant Examiner* — Edward Zhang
(74) *Attorney, Agent, or Firm* — KED & Associates, LLP

(57) ABSTRACT

A portable terminal is provided having an external module that is capable of easily charging a battery of the external module, such as a bluetooth, and of easily checking the charged status thereof. The charged status of a second battery of the external module may be displayed through a terminal body as well as the charged status of a first battery, thereby being capable of easily recognizing when the external module is required to be charged.

25 Claims, 8 Drawing Sheets

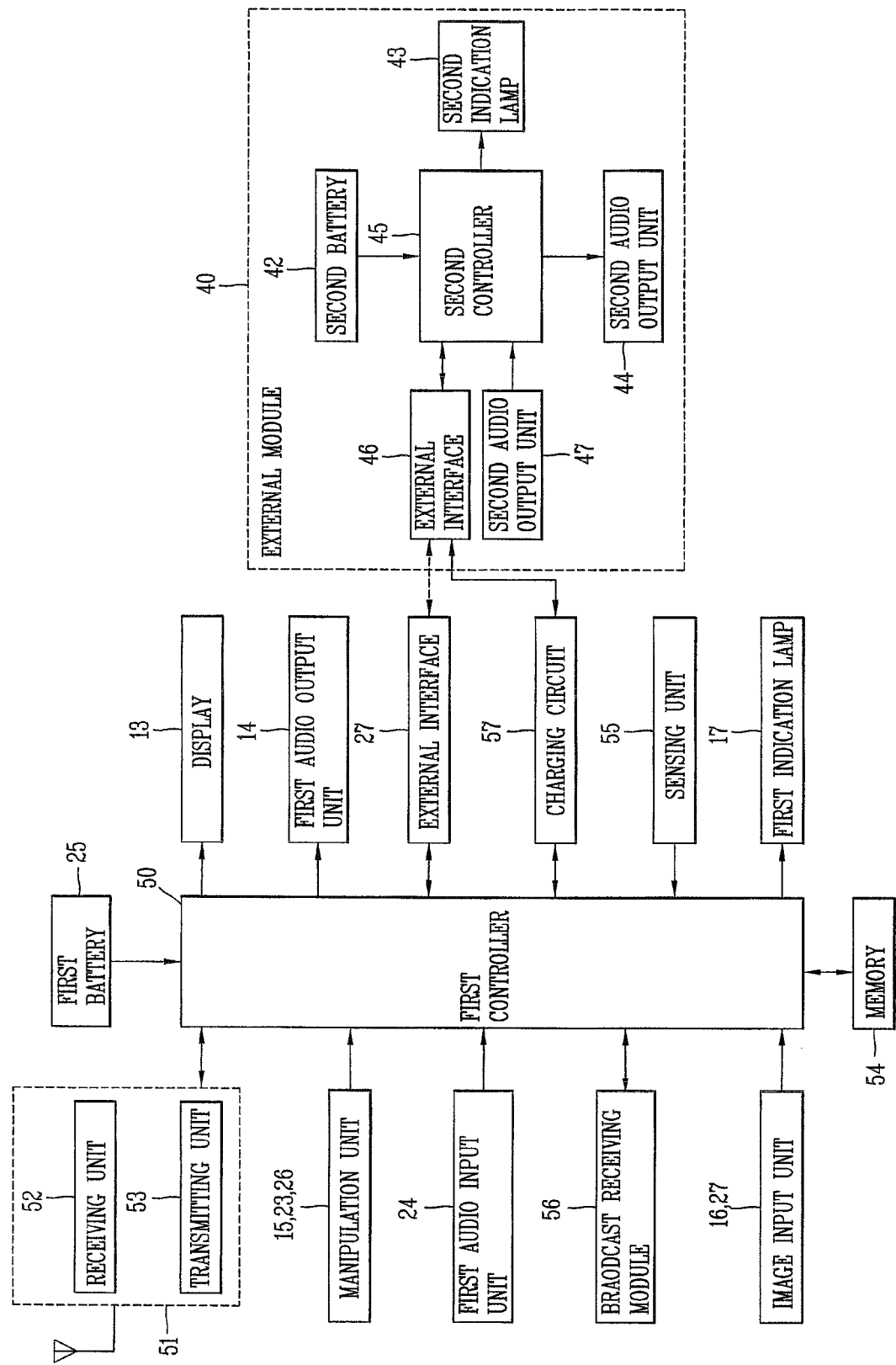

PORTABLE TERMINAL HAVING EXTERNAL MODULE AND METHOD FOR DISPLAYING CHARGED STATUS THEREOF

The present application claims priority from Korean Application No. 10-2007-0135702, filed Dec. 21, 2007, the subject matter of which is incorporated herein by reference.

BACKGROUND

1. Field

Embodiments of the present invention may relate to a portable terminal having an external module detachable to a terminal body and a display device to display an indicator that represents information of the charging of a battery in the external module.

2. Background

Portable terminals may be easily carried and have functions such as supporting voice calls and video calls, inputting and/or outputting information, storing data, etc.

Portable terminals may capture still images or moving pictures, play music or video files, play games, receive broadcast and the like, so as to be implemented as an integrated multimedia player.

Complicated functions have been provided for the multimedia player by hardware or software. For example, a user interface environment may be provided for users to easily and conveniently retrieve or select functions.

A bluetooth is a device for wirelessly connecting movable devices (such as a portable terminal) to each other within a short range. A bluetooth device may be provided with a portable terminal. The bluetooth device may be provided with a rechargeable battery to maintain its functions and have mobility. The rechargeable battery may be configured to be charged by a charging device that is separate from the portable terminal.

However, even though the bluetooth device is configured to be adjacent to the portable terminal, a method for charging the bluetooth device and for informing of a charged status thereof is not implemented by the portable terminal.

BRIEF DESCRIPTION OF THE DRAWINGS

Arrangements and embodiments may be described in detail with reference to the following drawings in which like reference numerals refer to like elements and wherein:

FIG. 4 is a block diagram showing a portable terminal and an external module in accordance with an example embodiment of the present invention;

DETAILED DESCRIPTION

Figure 1:
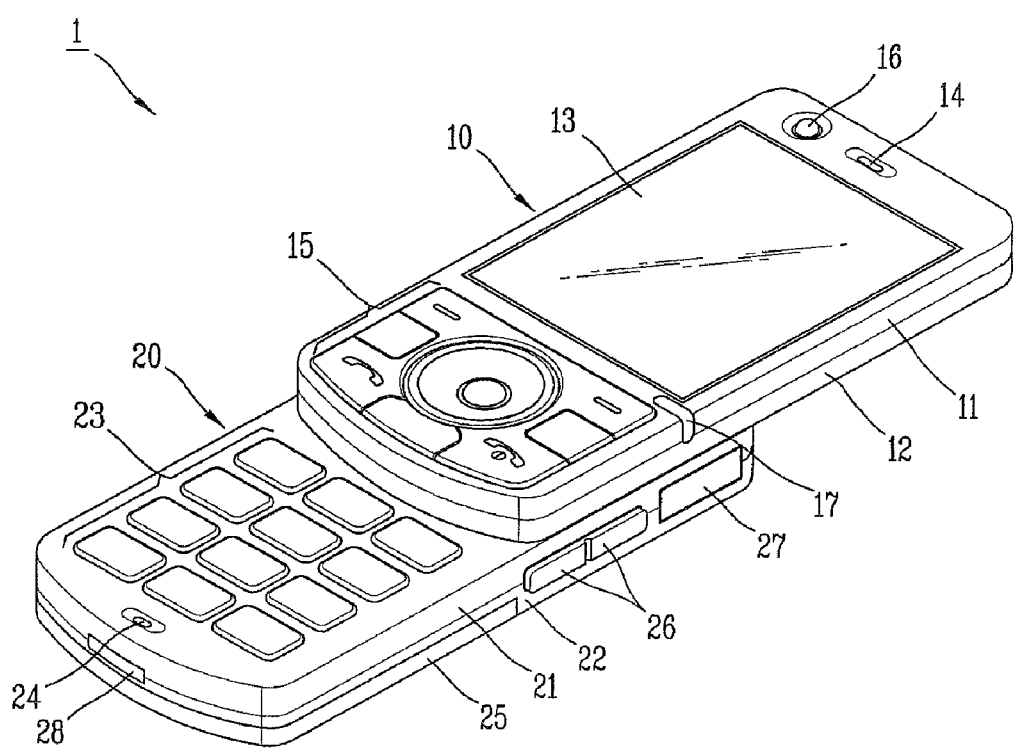
FIG. 1 is a view showing a portable terminal in accordance with an example embodiment of present invention.

FIG. 1 is a view showing a portable terminal in accordance with an example embodiment of the present invention. Other embodiments and configurations are also within the scope of the present invention.

As shown in FIG. 1, a portable terminal 1 may include a first terminal body 10 and a second terminal body 20 configured to be slidable with respect to the first terminal body 10 in at least one direction.

A configuration in which the first terminal body 10 overlaps with the second terminal body 20 may be referred to as a closed configuration (or a closed state). A configuration in which at least one portion of the second terminal body 20 is exposed by the first terminal body 10 may be referred to as an open configuration (or an open state).

In the closed configuration, the portable terminal 1 may operate in a standby mode, and the standby mode may be released by a user's manipulation. In the open configuration, the portable terminal 1 may operate in a call mode, and the call mode may be converted into the standby mode by the user's manipulation or after a certain time elapses.

A case (a casing, a housing, a cover, etc.) forming an external appearance of the first terminal body 10 may be formed by a front case 11 and a rear case 12. Electronic components may be disposed in a space formed by the front case 11 and the rear case 12.

At least one intermediate case may be additionally provided between the front case 11 and the rear case 12. The cases may be formed of a synthetic resin based on an injection method, or may be formed of a metallic material such as stainless steel (STS) or titanium (Ti).

A display 13, a first audio output unit 14, a first image input unit 16 and/or a first manipulation unit 15 may be provided on or in the first terminal body 10.

The display 13 may include a Liquid Crystal Display (LCD) module, an Organic Light Emitting Diodes (OLED) module, etc. to visually represent information. The display 13 may further include a touch screen so the user may input information.

The first audio output unit 14 may output various notification sounds of a system or a reproduction sound of multimedia as well as a calling sound. The first audio output unit 14 may be implemented in a plurality in ways so as to implement a stereo function, and/or may be used as a speakerphone mode while talking over a telephone.

The first image input unit 16 may be implemented as a camera module for shooting an image or a moving picture for a user.

The first terminal body 10 may be provided with an indicator for indicating a charged status of a battery mounted on an external module as will be explained below. The indicator may be a first indication lamp 17 outwardly exposed on an outer surface of the first terminal body 10. The first indication lamp 17 may be formed by an LED that varies in color according to whether or not the battery (on the external module) is fully charged. For example, while the battery (on the external module) is being charged, the first indication lamp 17 may emit light in red. On the other hand, when the battery (on the external module) is fully charged, the first indication lamp 17 may emit light in green.

The first indication lamp 17 may indicate whether or not an external module (not shown in FIG. 1) is precisely connected, as well as whether or not the battery (on the external module) is fully charged. For example, when an electric connection of an external module is not precise, the first indication lamp 17 may flicker so as to induce the external module to be precisely connected. The first indication lamp 17 may be applied to a means for informing the portable terminal 1 that the portable terminal 1 is called up or the line is busy. The first indication lamp 17 may be applied to a means for informing an open status of the first terminal body 10 or a standby mode thereof.

The first indication lamp 17 may be provided on a front surface or a side surface of the first terminal body 10. The first indication lamp 17 may also be provided on the second terminal body 20.

The first terminal body 10 and the second terminal body 20 may include a front case 21 and a rear case 22.

The second terminal body 20, and more particularly a front surface of the front case 21, may be provided with a second manipulation unit 23.

One of the front case 21 and the rear case 22 may be provided with a third manipulation unit 26, a first audio input unit 24 and/or an external interface 27.

The first to third manipulation units 15, 23, 26 may be referred to as a manipulation unit that can adapt any manner like a tactile manner that a user can touch for manipulation. For example, the manipulation unit may be implemented as a dome switch, the touch screen or a touch pad by which a user can input commands or information in a pushing or touching manner. Alternatively, the manipulation unit may be implemented, for example, as a wheel, a jog or a joystick. The first manipulation unit 15 may input commands such as start, end, scroll or the like, and the second manipulation unit 23 may input figures, letters, symbols or the like. The third manipulation unit 26 may be a hot key that performs a specific function, such as activating the first image input unit 16.

The first audio input unit 24 may be implemented, for example, as a microphone to receive a user's voice or other sound.

The external interface 27 may serve as a path that allows the portable terminal 1 to exchange data with external devices including an external module. For example, the external interface 27 may be used in a wired or wireless manner, and may be one of a connection terminal to which an earphone is connected, an infrared data (IrDA) port, and a wireless LAN port.

The external interface 27 may be a card socket for receiving an external card such as a Subscriber Identification Module (SIM), a User Identity Module (UIM) or a memory card for storing information, etc.

A first battery 25 may be mounted at the rear case 22 to supply power to the portable terminal 1. The first battery 25 may be detachably coupled to inside or outside of the second terminal body 20.

The first battery 25 and/or the second terminal body 20 may include an external terminal to which a device such as a charging holder can be directly connected.

A connector 28 for receiving power from the outside of the portable terminal 1 may be provided at one side of the second terminal body 20 so as to charge the first battery 25 and a second battery (not shown in FIG. 1). The connector 28 may be configured to insert a plug such as an external travel charger thereinto, and may serve as an Input/Output (I/O) port.

Figure 2:
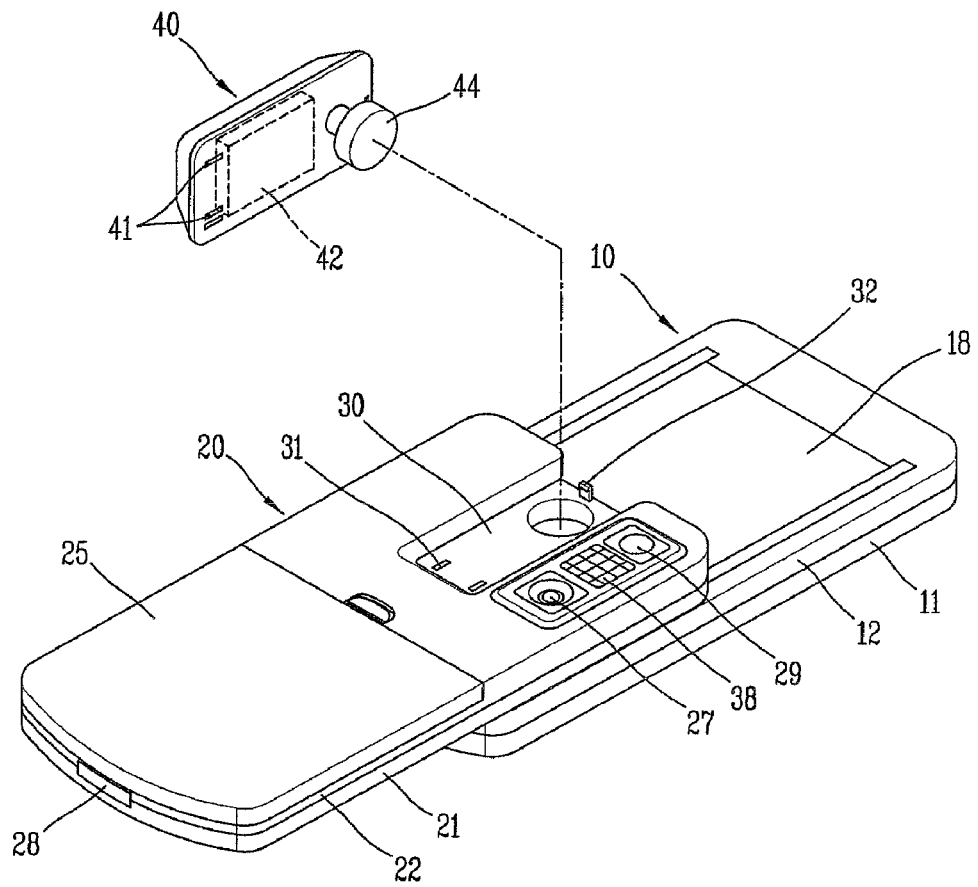
FIG. 2 is a rear view showing the portable terminal of FIG. 1.

FIG. 2 is a rear view showing the portable terminal of FIG. 1. Other embodiments and configurations are also within the scope of the present invention. As shown in FIG. 2, a second image input unit 27 may be provided at a rear surface of the rear case 22 of the second terminal body 20. The second image input unit 27 may be arranged in a shooting direction that is substantially opposite to a direction of the first image input unit 16. The second image input unit 27 may be a camera having pixels different from pixels of the first image input unit 16. For example, the first image input unit 16 may have low pixels so that a user's face can be captured and then transmitted to another side without any problem in case of a video call, while the second image input unit 27 may have high pixels since it is mainly used for a case that a general object is captured and the image is not immediately transmitted.

A flash 38 and a mirror 29 may be provided adjacent to the second image input unit 27. When capturing an object using the second image input unit 27, the flash 38 may provide a flashlight on the object. When the user captures himself/herself by using the second image input unit 27, the mirror 29 may be used for the user to look at himself/herself.

One portion of a slide module 18 by which the first terminal body 10 and the second terminal body 20 are slidably coupled to each other may be provided at the rear case 12 of the first terminal body 10. Another portion of the slide module 18 may be provided at the front case 21 of the second terminal body 20, and thus may not be outwardly exposed as shown in FIG. 2.

A compartment portion 30 may be formed at the rear surface of the second terminal body 20 to connect to a detachable external module 40. The external module 40 may be a bluetooth module, a speaker module and/or a wireless module, for example. The external module 40 may extend into the second terminal body 20.

The external module 40 may be formed to be used as an earphone so that a user's ear can have the earphone mounted therein. The external module 40 may include a second audio output unit 44 that may be inserted into the ear. The second audio output unit 44 may protrude from or recede into the external module 40. Accordingly, a space may not be unnecessarily wasted when the external module 40 is received in the compartment portion 30 of the second terminal body 20. The second audio output unit 44 may be provided in the user's ear while the external module 40 is being used.

The compartment portion 30 (and/or the second terminal body 20) may include a hook 32 by which the external module 40 can be mounted in the compartment portion 30.

The external module 40 may include an antenna (not shown) to communicate with the second terminal body 20 in a wireless manner. The external module 40 may also include a second battery 42 for supplying power for audio output or communication.

Contact pads 41 may be formed on a surface of the external module 40 facing the compartment portion 30 so that the external module 40 may electrically connect to the second terminal body 20. Contact terminals 31 may be provided in the compartment portion 30 (and/or the second terminal body 20) in a conductive spring shape corresponding to the contact pads 41. When the external module 40 is mounted in the compartment portion 30, the contact pads 41 may electrically connect to the contact terminals 31. Accordingly, the external module 40 and the second terminal body 20 can electrically connect to each other.

When an external power is supplied to the second terminal body 20 while the external module 40 is mounted in the second terminal body 20, the first battery 25 of the second terminal body 20 and the second battery 42 of the external module 40 may be charged. During this process, a charged status of the second battery 42 of the external module 40 may be transferred to the second terminal body 20 through the contact terminals 31 and the contact pads 41. The charged status or other information of the second battery 42 may be displayed by the portable terminal 1.

An antenna may be provided at the second terminal body 20 to communicate with the antenna of the external module 40. Accordingly, the charged status (or other information) of the second battery 42 may be transmitted to the second terminal body 20 in a wireless manner.

The second image input unit 27 may be provided at the second terminal body 20, although other configurations may also be provided. For example, one of the components provided on the rear case 22, such as the second image input unit 27, may be provided on the first terminal body 10 and more particularly on the rear case 12. The component(s) provided on the rear case 12 may be protected by the second terminal body 20 when the portable terminal is in a closed state. Even if the second image input unit 27 is not provided, since the first image input unit 16 is rotatably formed, the first image input unit 16 may be configured to be capable of shooting in a shooting direction of the second image input unit 27.

The portable terminal is not limited to a slide type portable terminal as shown in FIGS. 1 and 2, but rather may be applicable to various structures such as a folder type, a swing type, etc.

Figure 3:
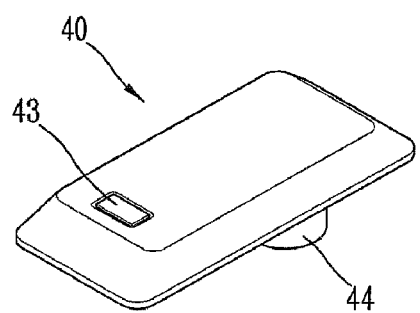
FIG. 3 is a view showing an external module.

FIG. 3 is a view showing an external module. Other embodiments and configurations are also within the scope of the present invention. Since the external module 40 is mounted in the second terminal body 20, the external module 40 may form an external appearance of the portable terminal 1. The external module 40 may include an indicator to indicate the charged status of the second battery 42. The indicator may be a second indication lamp 43 (or second indication light) that is outwardly exposed on an outer surface of the external module 40. The second indication lamp 43 may be formed by an LED that varies in color according to whether or not the second battery 42 is fully charged, such as in a similar manner as the first indication lamp 17. The second indication lamp 43 may also indicate whether or not the external module 40 is precisely connected.

The portable terminal may directly indicate the charged status of the second battery 42 of the external module 40 using the first indication lamp 17 of the first terminal body 10. That is, the second terminal body 20 may receive the charged status of the second battery 42 from the external module 40 electrically connected to the second terminal body 20 and output the charged status using the first indication lamp 17. Power for charging the second battery 42 of the external module 40 can be transferred from the second terminal body 20 to the external module 40, and the charged status may be transferred from the external module 40 to the second terminal body 20 and then outputted through the first indication lamp 17.

FIG. 4 is a block diagram showing a portable terminal and an external module in accordance with an example embodiment of the present invention. Other embodiments and configurations are also within the scope of the present invention.

The portable terminal may include a wireless communication module 51, manipulation units 15, 23, 26, image input units 16, 27, the first audio input unit 24, the display 13, the first audio output unit 14, a sensing unit 55, the external interface 27, a broadcast receiving module 56, a memory 54, the first indication lamp 17, the first battery 25, a charging circuit 57 and a first controller 50. The external module 40 may include a second controller 45, the second battery 42, an external interface 46, the second audio input unit 47, the second audio output unit 44 and the second indication lamp 43.

The charging circuit 57 may be provided in the second terminal body 20 and may charge the second battery 42 of the external module 40. That is, when the external module 40 is mounted in the second terminal body 20, the charging circuit 57 may supply external power supplied to the second terminal body 20 to the second battery 42 of the external module 40 and charge the second battery 42 based on the received external power.

The first controller 50 may control operations of the portable terminal. The operations may include controlling and processing related to a voice call, a data communication, a video call, etc. The first controller 50 may send a control command to the external module 40, receive data inputted from the external module 40 and/or receive status information of the external module 40 by being connected to the second controller 45 of the external module 40. The first controller 50 may transfer a control signal to the charging circuit 57 so as to charge the second battery 42 of the external module 40 and/or switch off the power.

The wireless communication module 51 may transmit/receive a radio (wireless) signal to/from a mobile communication base station via an antenna. For example, the wireless communication module 51 may transmit/receive voice data, character data, image data and control data under control of the first controller 50. The wireless communication module 51 may include a transmitting unit 53 modulating a signal and transmitting the signal and a receiving unit 52 demodulating the received signal.

The manipulation units 15, 23, 26 may be configured as shown in FIG. 1 and provide the first controller 50 with data inputted from the user to control operations of the portable terminal 1.

The image input units 16, 27 may process a video frame such as still images or moving pictures obtained by an image sensor in a video call mode or a shooting mode. The processed video frame may be converted into image data that can be displayed on the display 13 and outputted through the display 13.

The video frame processed by the image input units 16, 27 may be stored in the memory 54 under control of the first controller 50 or may be outwardly transmitted through the wireless communication module 51.

The first audio input unit 24 may receive an external audio signal through a microphone in the call mode, the recording mode and/or the voice recognition mode, and the first audio input unit 24 may process the signal into electric voice data. In the call mode, the processed voice data may be converted into a transmittable format toward the mobile communication base station through the wireless communication module 51 and then outputted to the wireless communication module. In the recording mode, the processed voice data may be outputted to be stored in the memory 54.

The first audio input unit 24 may implement various noise reduction algorithms for reducing noise generated in a process for inputting the external audio signal.

The display 13 may output information processed in the portable terminal 1. For example, when the portable terminal is in the call mode, a User Interface (UI) and/or a Graphic User Interface (GUI) related to the calling may be outputted under control of the first controller 50. When the portable terminal is in the video call mode or the shooting mode, the shot image or UI or GUT may be outputted under control of the first controller 50. The display 13 may output a fully charged status of the second battery 42 of the external module 40 in an image format or UI or GUT format under control of the first controller 50. When the portable terminal includes a touch screen, the display 13 may be used as an input device as well as an output device.

The audio output units 14, 44 may convert audio data received from the wireless communication module 51 or audio data stored in the memory 54 and outwardly output the audio data under control of the first controller 50 in a call signal receiving mode, the call mode, the recording mode, the voice recognition mode and/or the broadcast receiving mode.

The audio output units 14, 44 may output an audio signal related to functions executed in the portable terminal (e.g., call signal receive sound, message receive sound, etc.). The audio output units 14, 44 may include a speaker, a receiver, a buzzer, etc.

The sensing unit 55 may sense a current status of the portable terminal such as an open/closed status of the portable terminal, a position of the portable terminal, whether or not a user contacts the portable terminal, and then generates a sensing signal for controlling operations of the portable terminal. For example, when the portable terminal is a slide type phone, the sensing unit 55 may sense whether or not the slide phone is open and output the sensing result to the first controller 50. Accordingly, operations of the terminal may be controlled. The sensing unit 55 may also sense whether or not the first battery 25 supplies the power, whether or not the external interface 27 is coupled to an external device, etc.

The external interface 27 may serve as an interface with all external devices connected thereto, such as a wire/wireless headset, an external charger, a wire/wireless data port, a card socket (e.g., memory card, SIM/UIM card), etc. The external interface 27 may allow the data or power transmitted or supplied from the external device to be transferred to each component inside the portable terminal, or data inside of the portable terminal to be transmitted to the external device.

The memory 54 may store a program for processing and controlling the first controller 50, or inputted/outputted data (e.g., phonebook, message, still image, moving picture, etc.) may be temporally stored in the memory 54. The memory 54 may be a hard disk, a card-type memory (e.g., SD, XD memory etc.), a flash memory, a RAM, a ROM, etc.

The broadcast receiving module 56 may receive a broadcast signal transmitted through a satellite wave or a ground wave and output the signal to the first controller 50 by converting the signal into a broadcast data format that can be outputted to the audio output units 14, 44 and the display 13. The broadcast receiving module 56 may receive additional data (e.g., EPG (Electric Program Guide), channel list, etc.) related to the broadcasting. The additional data and the broadcast data converted by the broadcast receiving module 56 may be stored in the memory 54.

The first battery 25 may be applied with an external or internal power under control of the first controller 50 and may then be supplied with the power required for operation of each component. Information on the charged status of the first battery 25 may be transferred to the first controller 50 and then outwardly displayed through the display 13 or the first indication lamp 17.

The second controller 45 may receive a control signal transferred from the portable terminal through the external interface 46 and then output audio information through the second audio output unit 44. The second controller 45 may also receive information on user's voice from the second audio input unit 47 and then transmit the information to the portable terminal. Still further, the second controller 45 may transfer status information of the second battery 42 to the portable terminal. The second controller 45 may apply a control signal so that the charged status of the second battery 42 can be outputted using the second indication lamp 43.

Figure 5A:
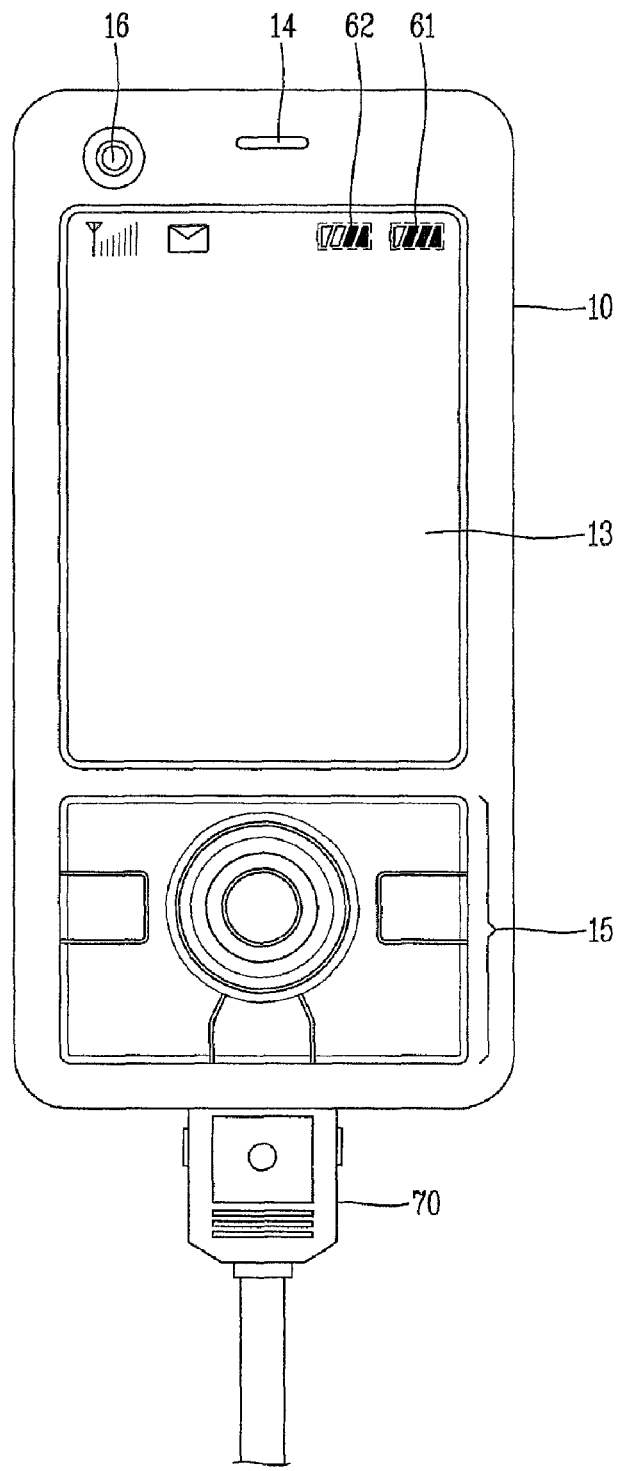
FIGS. 5A and 5B are views respectively showing a portable terminal displaying icons to indicate charged status of the portable terminal and an external module in accordance with an example embodiment of the present invention.
Figure 5B:
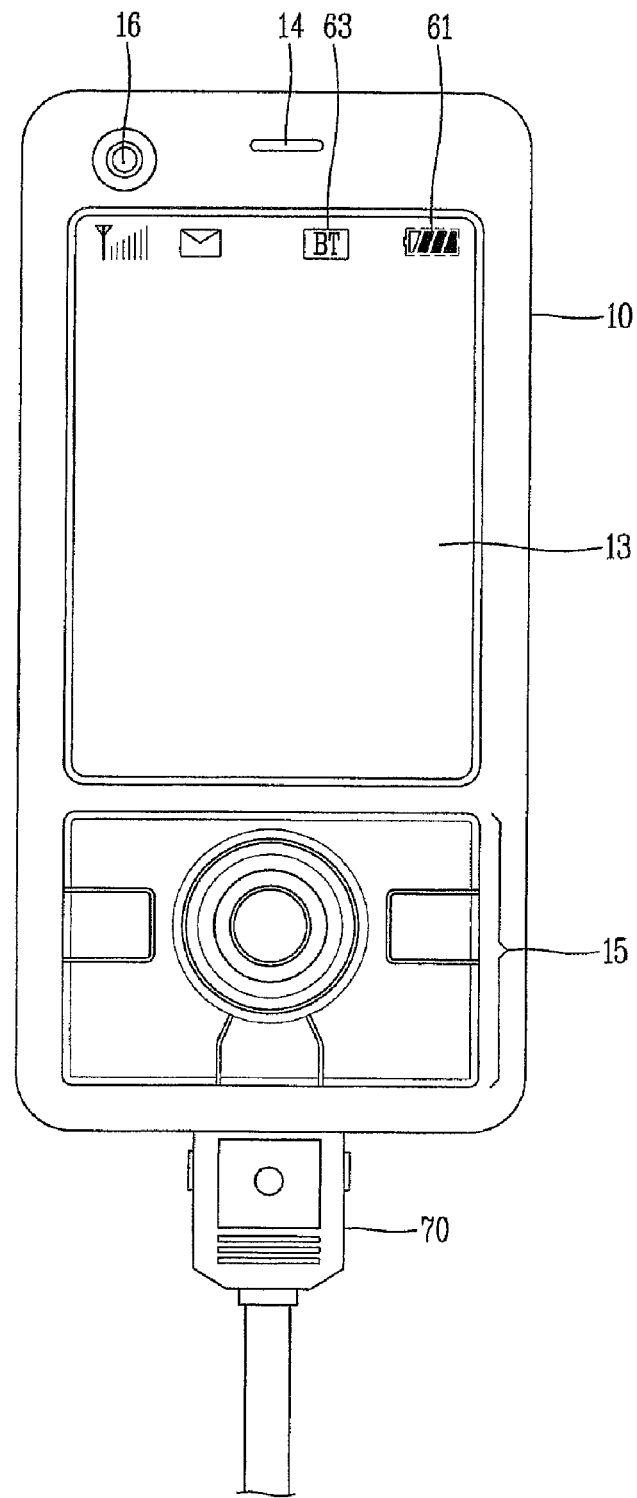

FIGS. 5A and 5B are views respectively showing a portable terminal displaying icons to indicate charged status of the portable terminal and an external module in accordance with an example embodiment of the present invention. Other embodiments and views are also within the scope of the present invention. An indicator for indicating the charged status of the second battery 42 of the external module 40 may be implemented as an image or graph outputted using the display 13.

FIGS. 5A and 5B show an external charging plug 70 connected to the terminal body 10. Accordingly, when an external power is supplied, the external power may be transferred to the first battery 25 of the terminal body 10 and the second battery 42 of the external module so as to execute a charging operation.

The display 13 may display a first icon 61 that graphically represents the first battery 25 and a second icon 62 that graphically represents the second battery 42.

The first icon 61 and the second icon 62 may include one or more graphic cells, respectively. The number of graphic cells for each icon may be increased to indicate an increased charged degree of the first battery 25 or the second battery 42. For example, the number of graphic cells may gradually change (e.g., 1→2→3→4→1). When the charging is completed, all the graphic cells of one icon may flicker.

As shown in FIG. 5B, the charged status of the second battery 42 of the external module 40 may be implemented in an icon or graphic format different from FIG. 5A. The indicator for indicating whether or not the second battery 42 of the external module 40 is fully charged may be a separate icon 63 to prevent confusion with the first battery 61. The icon 63 may be inactivated when the second battery 42 of the external module 40 is not connected to the terminal main body 10 or is not being charged. When a connection status of the external module 40 is inferior, the icon 63 may flicker. The icon 63 may be implemented in different colors based on whether or not the second battery 42 of the external module 40 is fully charged.

Figure 6:
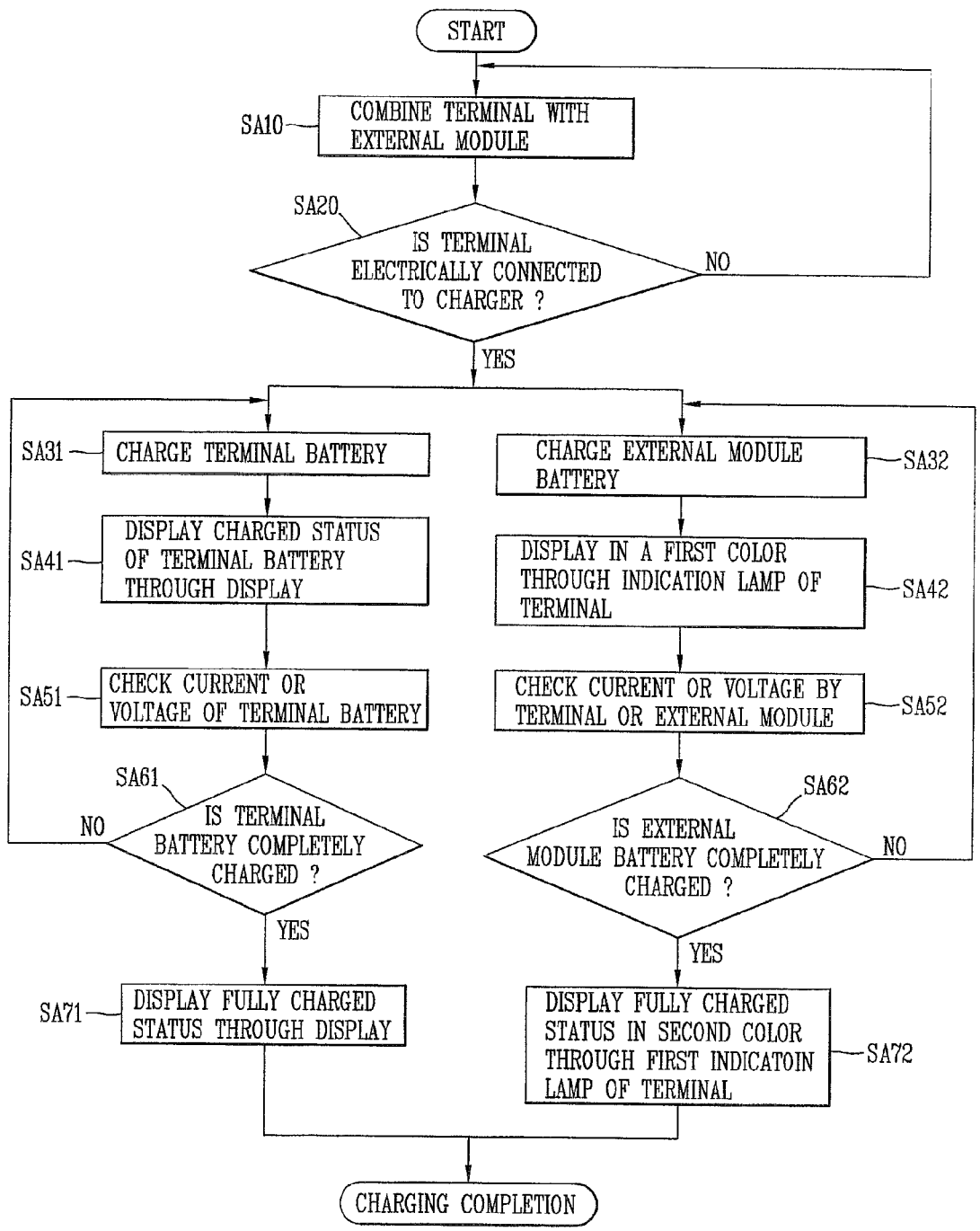
FIG. 6 is a flow chart showing a process for indicating a charged status of a portable terminal and an external module in accordance with an example embodiment of the present invention.

FIG. 6 is a flow chart showing a process for indicating a charged status of a portable terminal and an external module in accordance with an example embodiment of the present invention. Other operations, orders of operations and embodiments are also within the scope of the present invention.

A method for displaying the charged status may include combining a terminal body with an external module, charging a first battery of the terminal body and a second battery of the external module after the terminal body is mounted to a charger, and outputting information regarding whether or not the first battery and the second battery are charged or a level of the charging.

More specifically, FIG. 6 shows that the portable terminal may be combined with the external module in operation SA10, and the first controller may determine whether or not the portable terminal is connected to the charger in operation SA20.

If the portable terminal is connected to the charger, the first battery of the terminal may be charged in operation SA31 and the second battery of the external module may be charged in operation SA32. Although not shown, an operation of previously checking whether or not the first battery and the second battery are fully charged may be further included.

When beginning to charge the first battery and the second battery, a charged status of the first battery may be displayed through the display in operation SA41, and a charged status of the second battery may be indicated in a first color of a first indication lamp on the terminal body in operation SA42. The charged status of the first battery displayed through the display may be provided in an icon format, and the second indication lamp may indicate that the second battery is being charged in red, for example.

The charged status of the first battery that is being charged may be certified by checking a current or a voltage of the first battery in operation SA51. The charged status of the second battery that is being charged may be certified by checking a current or a voltage by the external module itself or by the portable terminal in operation SA52.

By certifying the checked current and voltage, determinations may be made that the first battery of the terminal and the second battery of the external module are fully charged in operations SA61, SA62. When the first battery is fully charged, a fully charged status may be displayed in an icon format in operation SA71. When the second battery is fully charged, a fully charged status of the second battery may be displayed by the first indication lamp in a second color in operation SA72. If the batteries are not fully charged, the first battery and the second battery may be continuously charged in operations SA31 and SA32.

Figure 7:
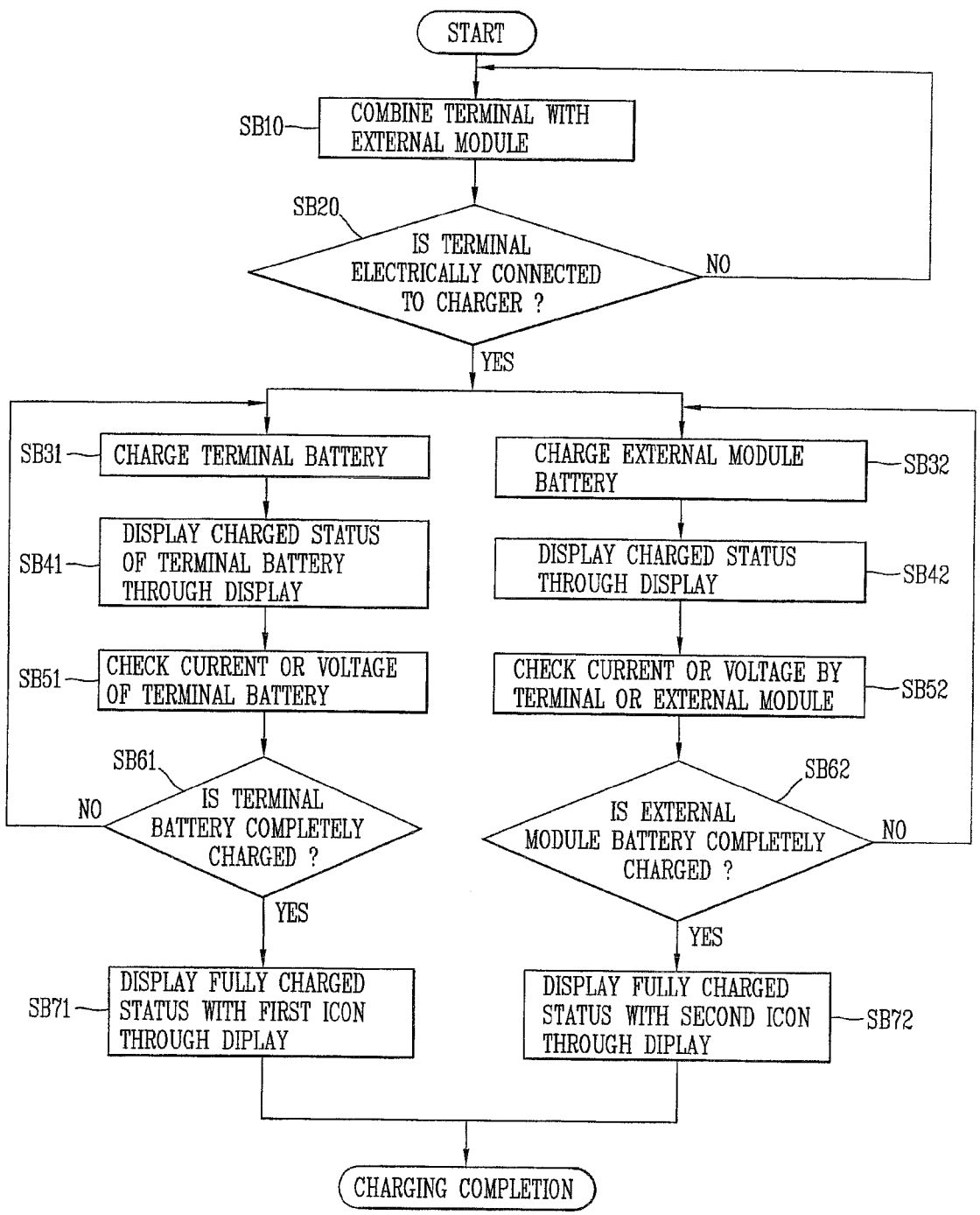
FIG. 7 is a flow chart showing a process for indicating a charged status of a portable terminal and an external module in accordance with an example embodiment of the present invention.

FIG. 7 is a flow chart showing a process for indicating a charged status of a portable terminal and an external module in accordance with an example embodiment of the present invention. Other operations, orders of operations and embodiments are also within the scope of the present invention.

The flow chart shown in FIG. 7 relates to whether or not the first battery and the second battery are charged and the status being outputted through a display formed at the terminal body.

FIG. 7 shows that the portable terminal may be combined with the external module in operation SB10, and the first controller may determine whether or not the portable terminal is connected to the charger in operation SB20.

If the portable terminal is connected to the charger, the first battery of the terminal may be charged in operation SB31 and the second battery of the external module may be charged in operation SB32. Although not shown, an operation of previously checking whether or not the first battery and the second battery are fully charged may be further included.

When beginning to charge the first battery and the second battery, a charged status of the first battery may be displayed on the display in operation SB41, and a charged status of the second battery may be displayed on a display in operation SB42.

The charged status of the first battery that is being charged may be certified by checking a current or a voltage of the first battery in operation SB51. The charged status of the second battery that is being charged may be certified by checking a current by the external module itself or by the portable terminal in operation SB52.

By certifying the checked current and voltage, determinations may be made that the first battery of the terminal and the second battery of the external module are fully charged in operations SB61, SB62. When the first battery is fully charged, a fully charged status of the first battery may be displayed in an icon format on the display in operation SB71. When the second battery is fully charged, a fully charged status of the second battery may be displayed in an icon format on the display in operation SB72. If the batteries are not fully charged, the first battery and the second battery may be continuously charged in operations SB31 and SB32.

Figure 8:
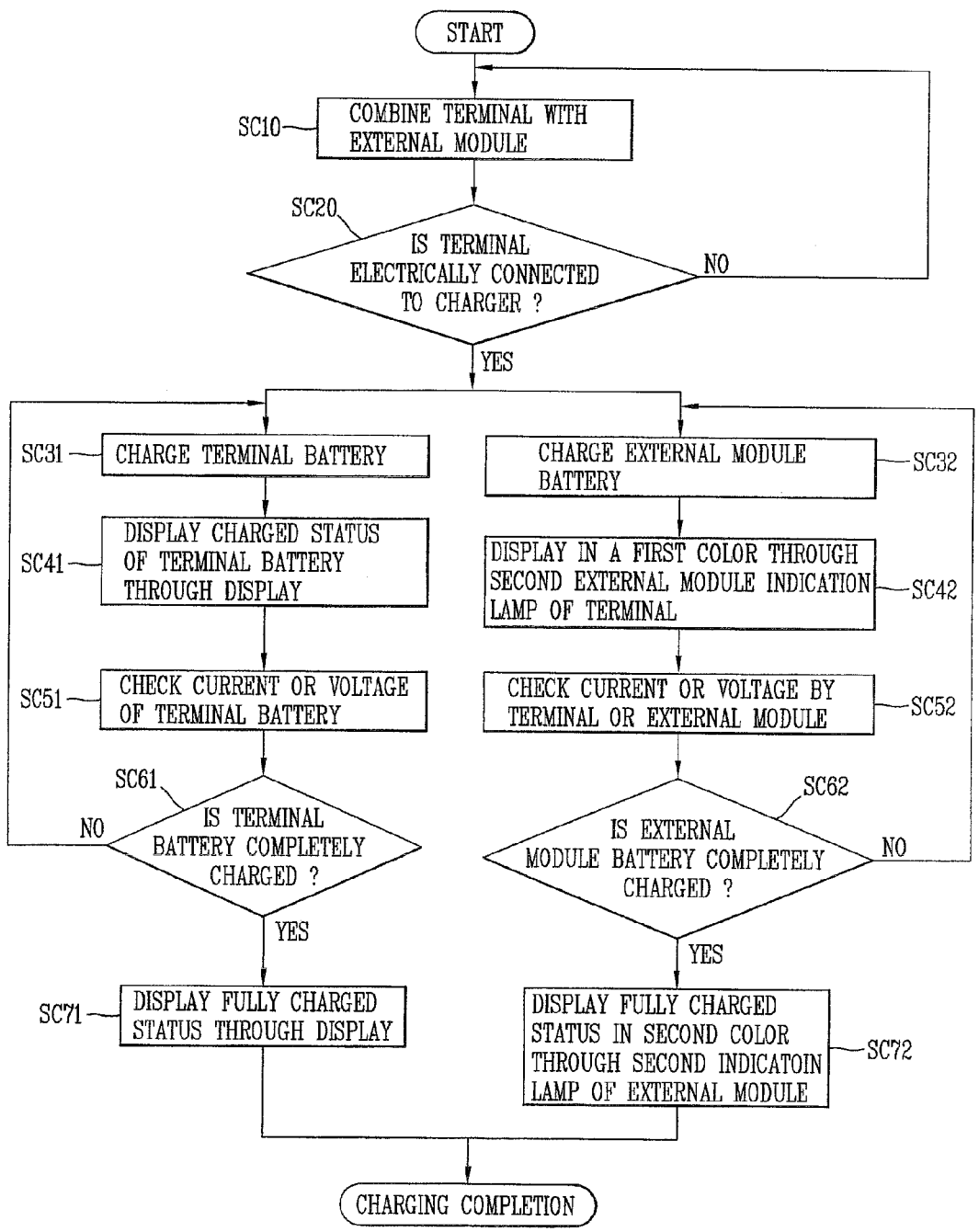
FIG. 8 is a flow chart showing a process for indicating a charged status of a portable terminal and an external module in accordance with an example embodiment of the present invention.

FIG. 8 is a flow chart showing a process for indicating a charged status of a portable terminal and an external module in accordance with an example embodiment of the present invention. Other operations, orders of operations and embodiments are also within the scope of the present invention.

The flow chart shown in FIG. 8 relates to whether or not the first battery is charged being outputted on the display formed at the terminal body, and whether or not the second battery is charged being outputted through a second indication lamp at the external module.

FIG. 8 shows that the portable terminal may be combined with the external module in operation SC10, and the first controller may determine whether or not the portable terminal is connected to the charger in operation SC20.

If the portable terminal is connected to the charger, the first battery of the terminal and the second battery of the external module may be charged in operation SC32. Although not shown, an operation of previously checking whether or not the first battery and the second battery are fully charged may be further included.

When beginning to charge the first battery and the second battery, a charged status of the first battery may be displayed on the display in operation SC41, and a charged status of the second battery may be indicated based on a first color of a second indication lamp formed on the external module in operation SC42.

The charged status of the first battery that is being charged may be certified by checking a current or a voltage of the first battery in operation SC51. The charged status of the second battery that is being charged may be certified by checking a current or a voltage of the second battery by the external module itself or the portable terminal in operation SC52.

By certifying the checked current and voltage, determinations may be made that the first battery of the terminal and the second battery of the external module are fully charged in operations SC61, SC62. When the first battery is fully charged, a fully charged status of the first battery may be displayed in an icon format on the display in operation SC71. When the second battery is fully charged, a fully charged status of the second battery may be displayed in a second color of the indication lamp of the external module in operation SC72. If the batteries are not fully charged, the first battery and the second battery may be continuously charged in operations SC31 and SC32.

Embodiments of the present invention may provide a portable terminal having an external module such as a bluetooth that is capable of easily charging a battery of the external module and easily checking a charged status thereof, and a method for displaying a charged status thereof.

A portable terminal may include a terminal body provided with a compartment portion for mounting a detachable external module therein, a charging circuit (module) provided in the terminal body so as to charge a battery disposed in the external module and an indicator for indicating a charged status of the battery. Since the battery of the external module can be charged through the terminal body, an additional charging device is not required to be installed to the external module and a charged status of the external module can be easily certified through the terminal body. The charging circuit (module) may receive an external power connected to the terminal body and supply it to a battery of the external module.

The compartment portion may be formed in a receiving groove in which the external module can be received, and the compartment portion may be provided with contactors for charging the battery of the external module. Accordingly, the battery of the external module may be charged through the contactors disposed in the compartment portion of the terminal body.

The indicator may indicate whether or not the battery of the external module is fully charged when the external module is mounted in the compartment portion of the terminal body.

The indicator may be a first indication lamp installed on an outer surface of the terminal body or a second indication lamp installed on the outer surface of the external module. The first and second indication lamps may be formed by an LED indicating whether or not the battery of the external module is fully charged in different colors. For example, while the battery of the external module is being charged, the indication lamp may emit light in red. On the other hand, when the battery of the external module is completely charged, the indication lamp may emit light in green.

The indicator may be implemented as an image outputted on a display installed at the terminal body. The indicator may be provided in an icon and/or graphic format. The charged status of the battery of the external module may be outputted in another mode of the terminal body. For example, a user can be informed of the charged status by selecting a menu item indicating the charged status of the battery of the external module.

A charged status of a second battery may be outputted in another mode of the terminal body. For example, the user can be informed of the charged status of the second battery by selecting a menu item indicating the charged status of the second battery.

The indicator may identify whether or not the external module is mounted in the terminal main body.

The indicator may be implemented by color variation or flickering of an icon or graphic when the external module is fully charged.

The terminal body may be configured to receive the charged status of the second battery from the external module in a wireless manner, and the indicator may display the charged status of the external module.

The external module may be one of a bluetooth module, a speaker module and a wireless module. The external module may be configured to transmit/receive a signal by being connected to the terminal body in the wireless manner. The external module may be implemented as an earphone that can be directly mounted in a user's ear.

A method may be provided for displaying a charged status of a portable terminal having an external module. The method may include combining a terminal body with an external module detachable to the terminal body, charging a battery of the external module by a charging circuit (module) of the terminal body as a result of connecting the terminal body to a charger, and outputting a charged status of the battery of the external module through an indicator.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable terminal comprising:
   a terminal body having a compartment portion for connecting to a detachable external module;
   a charging circuit provided in the terminal body to charge a battery in the external module;
   a connecting device in the compartment portion to electrically connect the charging circuit to the battery; and
   a display device, on the terminal body, to display an indicator that represents information of a charge level of the battery in the external module that is currently external to the terminal body, wherein the display device simultaneously displays a first icon relating to the charge level of the battery in the external module, and a second icon relating to a charge level of a battery within the terminal body, wherein the first icon is the indicator, wherein the terminal body wirelessly receives the information of the charge level of the battery from the external module that is currently external to the terminal body, and the first icon displayed on the display device represents the information of the charge level of the battery in the external module.

2. The portable terminal of claim 1, wherein the charging circuit to receive external power and to charge the battery of the external module based on the received external power.

3. The portable terminal of claim 1, wherein the indicator displayed on the display device indicates whether or not the battery of the external module is fully charged when the external module is connected to the connecting device.

4. The portable terminal of claim 1, further comprising a first indication lamp on a surface of the terminal body to indicate information of charging of a battery within the terminal body.

5. The portable terminal of claim 4, further comprising a second indication lamp on a surface of the external module to indicate information of charging of the battery in the external module.

6. The portable terminal of claim 1, wherein the indicator displayed on the display device identifies whether or not the external module is connected to the connecting device such that the charging circuit can charge the battery in the external module.

7. The portable terminal of claim 1, wherein the indicator displayed on the display device provides a color variation or flickering when the battery in the external module is fully charged.

8. The portable terminal of claim 1, wherein the external module is one of a bluetooth module, a speaker module and a wireless module.

9. A method of providing a charged status comprising:
   connecting a terminal body of a portable terminal with an external module of the portable terminal;
   charging a battery of the external module using a charging circuit of the portable terminal when the terminal body is electrically connected to the external module;
   wirelessly receiving, at the portable terminal, information of a level of the charge of the battery from the external module when the external module is disconnected from the terminal body; and
   displaying, on a display screen of the terminal body, an indicator that represents the information of the level of the charge of the battery of the external module that is currently disconnected from the terminal body, wherein displaying the indicator includes displaying, on the display screen, a first icon relating to the level of the charge of the battery of the external module, and simultaneously displaying, on the display screen, a second icon relating to a level of charge of a battery within the terminal body.

10. The method of claim 9, wherein the indicator displayed on the display screen indicates whether or not the battery of the external module is fully charged when the external module is connected to the terminal body.

11. The method of claim 9, further comprising providing information of charging of a battery in the terminal body using a first indication lamp on a surface of the terminal body.

12. The method of claim 11, further comprising providing information of charging of the battery in the external module using a second indication lamp on a surface of the external module.

13. The method of claim 9, wherein the indicator displayed on the display screen identifies whether or not the external module is connected to the terminal body such that the charging circuit can charge the battery in the external module.

14. The method of claim 9, wherein the displaying includes providing a color variation or flickering when the battery of the external module is fully charged.

15. The method of claim 9, wherein the external module is one of a bluetooth module, a speaker module and a wireless module.

16. A portable terminal comprising:
a terminal body to connect to a detachable module;
a charging circuit to charge a battery in the detachable module;
a connecting device to electrically connect the charging circuit to the battery of the detachable module; and
a display device, on the terminal body of the portable terminal, to display a first icon relating to a charge level of the battery of the detachable module, and to simultaneously display a second icon relating to a charge level of a battery within the terminal body, wherein the terminal body wirelessly receives information of the charge level of the battery from the detachable module that is physically disconnected from the terminal body.

17. The portable terminal of claim 16, wherein the first icon displayed on the display device indicates whether or not the battery of the detachable module is fully charged when the detachable module is connected to the connecting device.

18. The portable terminal of claim 16, further comprising a first indication lamp on a surface of the terminal body to indicate information of charging of a battery within the terminal body.

19. The portable terminal of claim 18, further comprising a second indication lamp on a surface of the detachable module to indicate information of charging of the battery in the detachable module.

20. The portable terminal of claim 16, wherein the first icon displayed on the display device identifies whether or not the detachable module is connected to the connecting device such that the charging circuit can charge the battery.

21. The portable terminal of claim 16, wherein the first icon displayed on the display device provides a color variation or flickering when the battery of the detachable module is fully charged.

22. The portable terminal of claim 16, wherein the detachable module is one of a bluetooth module, a speaker module and a wireless module.

23. The portable terminal of claim 16, wherein the displayed first icon has a plurality of graphic cells each representing a different charge level of the battery of the detachable module.

24. The portable terminal of claim 1, wherein the first icon has a plurality of graphic cells each representing a different charge level of the battery in the external module.

25. The method of claim 9, wherein the displayed first icon has a plurality of graphic cells each representing a different level of charge of the battery of the external module.

* * * * *